United States Patent [19]
Van Den Heuvel

[11] Patent Number: 4,704,632
[45] Date of Patent: Nov. 3, 1987

[54] ELECTRONIC CAMERA FOR DIGITAL PROCESSING OF CCD DATA

[75] Inventor: Raymond C. Van Den Heuvel, Northridge, Calif.

[73] Assignee: Terminal Data Corporation, Simi Valley, Calif.

[21] Appl. No.: 845,581

[22] Filed: Mar. 28, 1986

Related U.S. Application Data

[63] Continuation-in-part of Ser. No. 845,403, Mar. 20, 1986.

[51] Int. Cl.$^4$ ............................. H04N 1/411; H04N 1/41
[52] U.S. Cl. .............................. 358/209; 358/213.15; 358/282
[58] Field of Search ............... 358/284, 212, 213, 282, 358/280

[56] References Cited
U.S. PATENT DOCUMENTS

| 4,205,341 | 5/1980 | Mitsuya et al. | 358/284 |
| 4,351,004 | 9/1982 | Choate et al. | 358/282 |
| 4,446,486 | 5/1984 | Itoh | 358/282 |
| 4,578,715 | 3/1986 | Yamaguchi | 358/284 |

Primary Examiner—Gene Z. Rubinson
Assistant Examiner—Stephen Brinich
Attorney, Agent, or Firm—Elliott N. Kramsky

[57] ABSTRACT

A camera for sensing image information and accurately and quickly reducing such information to a plurality of black and white analog voltages corresponding to pixels of a line image scan. A sensor of the CCD type generates a plurality of electron packets which are read out as two analog voltages. After d.c. restoration and normalization, the analog voltages are promptly converted to gray scale digital values to preserve maximum image information for subsequent processing. Thereafter, the digital signals are reordered to correspond to the physical ordering of the photocells of the sensor and applied to a hybrid digital filter for rapid hybrid (analog/digital filter) image enhancement.

3 Claims, 6 Drawing Figures

ELECTRONIC CAMERA FOR DIGITAL PROCESSING OF CCD DATA

REFERENCE TO RELATED PATENT APPLICATION

This application is a continuation-in-part of U.S. patent application Ser. No. 845,403 of Raymond Van den Heuvel titled titled "CCD Television Camera". This application was filed on Mar. 20, 1986 and claims priority of Sept. 5, 1984 pursuant to the Patent Cooperation Treaty.

BACKGROUND OF THE INVENTION

1. Field of the Invention

The present invention relates to apparatus and methods for electronically reading and transmitting documents and microfilmed images. More particularly, this invention pertains to a new electronic camera for processing information as sensed by a charge coupled device (CCD).

2. Description of the Prior Art

The advantages of electronic processing in the storage and transmission of document-type images are well-recognized. Such storage may take numerous forms including magnetic (tape or disc) and optical (laser disc) media while transmission may take place by cable, radio and telephone links and the like. Such processes, unlike photographic processes, are recognized to be economical, instantaneous and impervious to aging or deterioration.

In the electronic processing of images, a promising sensor technology, as a replacement for the Vidicon and like camera tubes, is the charge coupled device (CCD). This solid state sensor does not introduce geometric distortions into the image, it is compact, and it requires no sophisticated electronic circuits for actuation.

The output of the CCD sensor is an analog voltage. This analog value often must be converted to digital format. Such analog-to-digital conversion is especially pertinent when a binary photocopy-like output is desired. In such a case, no "gray" shades are employed. Every pixel of the image is either "black" or "white".

The conversion of a "real-life" image to binary format inherently requires the application of "intelligence". That is, for each pixel that is neither black nor white (i.e. a gray pixel), a decision must be made assigning one or the other value. In the case of typewritten documents, such decisions are generally not difficult. It is often adequate in such cases to assign white to any pixel having a value in the upper half of a light scale and black to any pixel having a vallue in the lower half of such a scale. The dividing line is known as a "fixed decision level" and the above-described technique is common to a rather "primitive" camera.

The entire process is complicated when colors are employed or when reading film that is neither as transparent or opaque as expected. Defocussing can alter the opacity of a thin black character element. The presence of fingerprints and scratches can modify light and dark values. Attempts have been made to compensate for such anomalies by local modification of the decision level for the scanned area. Among the techniques for effecting the decision level is that of "dynamic thresholding" as shown, for example, in United States patent Ser. No. 4,399,470. In that patent there is disclosed an analog circuit for storing the light values of the pixels immediately preceding and following the "decision pixel". The threshold value employed is arrived at through the simple averaging of the two proximate values. Such a method is inherently limited and sometimes incapable of effective and accurate resolution of "tricky" images.

SUMMARY OF THE INVENTION

The foregoing shortcomings and disadvantages of the prior art are addressed and overcome by the present invention that provides, in a first aspect, an electronic camera for processing at least one electrical signal comprising the intensity values of a plurality of pixels of an image detected by a CCD. The camera includes means in communication with the CCD for converting at least one signal into a digital signal that includes gray level information. Such means includes (i) menas for storing the black level of at least one analog signal during successive charge accumulation periods, (ii) means including at least one amplifier for taking the difference between the black level and the analog pixel signal levels generated during each charge accumulation period and (iii) means including at least one flash converter for generating the digital signal equivalent of each of the differences and (iv) means for applying a reference signal to the means for generating the digital signal equivalent so that the digital signal represents a ratio of a predetermined voltage range.

Means are provided for filtering the digital signal in accordance with adjacent pixel information to generate a dynamic threshold with respect to a preselected scanned pixel. Means are further provided for assigning a black or white level signal value to such preselected pixel in accordance with the dynamic threshold and for providing such assigned signal value to an output device.

In a further aspect, the invention provides an electronic camera for processing at least one electrical signal comprising the intensity values of a plurality of pixels of an image detected by a CCD that includes means in communication with the CCD for converting the signal into a digital signal that includes gray level information. Means are provided for filtering the digital signal in accordance with adjacent pixel information to generate a dynamic threshold with repsect to a preselected scanned pixel. Such means includes (i) means for weighting the analog values of preselected adjacent pixels by predetermined values and (ii) means for combining the weighted analog values with the analog value of the predetermined scanned pixel to derive a dynamic threshold value. The combining means includes (i) a first operational amplifier for accepting the analog value of the preselected scanned pixel, (ii) a second operational amplifier for accepting the sum of the weighted analog values of the adjacent pixels, (iii) means for detecting the peak analog value of the preselected pixel and (iv) means for adjusting the d.c. bias of the second operational amplifier in accordance with the peak value.

Means, comprising a comparator arranged to accept the output of the means for combining the weighted analog values with the analog value of hte predetermined scanned pixel, is providing for assigning a black or white level signal value to the preselected pixel in accordance with the dynamic threshold and for providing the assigned signal value to an output device.

The foregoing and additional features and advantages of this invention will become further apparent from the detailed description that follows. This description is accompanied by a set of drawing figures. Numerals utilized in conjunction with the drawing figures correspond to numerals in the written description. Like numerals refer to like features of the invention throughout both the written description and the drawing figures.

DETAILED DESCRIPTION

Figure 1:
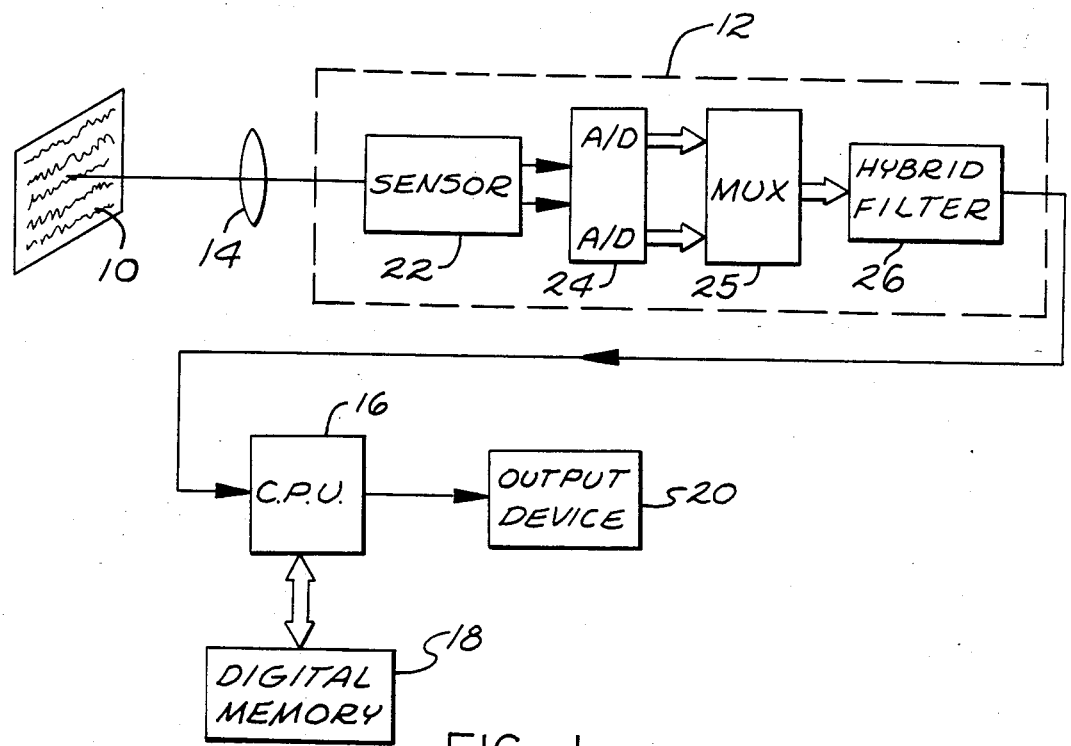
FIG. 1 is a block diagram of a camera system including a camera in accordance with the invention.

Turning now to the drawings, FIG. 1 is a block diagram of a camera system including a CCD in accordance with the invention. Systems of this type are commonly arranged to sense or detect an image (for subsequent storage) of, for example, a document 10. By providing an electrical equivalent of the document 10, record storage problems can be greatly alleviated and record transmission can be made instantaneous. Greater attention must be paid to accurate and faithful image reproduction since the recorded image often serves as a company's primary (or sole) source of working documentation.

The document 10 is imaged onto the camera 12 of the invention by means of a lens 14 and associated apparatus well known to the optical arts. After detection and signal processing within the camera 12 (discussed in detail below), an electrical signal is generated and directed to the central processing unit 16 of an image enhancement computer. Following processing within the c.p.u. 16, the signal is stored (for later retrieval) in a random access memory (RAM) 18.

When desired, the electronic representation of the image of the document 10 may be recalled from the RAM 18. This image may then be displayed on a conventional display device 20 such as, but not limited to, a video data terminal. By converting the optical image to a (digital) electrical representation, such image need never be fixed onto a degradable medium such as film, reducing cost and further minimizing storage problems. Substantial volumes of documentation may be stored in digital RAM memory or laser disc for subsequent input to a display device 20 (or other use) only when (and if) needed.

The primary functional units of the camera 12 are indicated within the dashed box. A sensor 22 detects the image transmitted through the lens-optics 14. The sensor 22 is preferably of the type that is sensitive to variations in the light radiation emitted from the surface of the document 10 (or other object) whereby corresponding local variation are induced in the electrical charges of the sensor. Such sensors may be of various wavelength sensitivities in accordance with their physical structures. Photodiodes or semiconductive and semi-insulative materials, such as silicon and gallium arsenide, respectively, often comprise a central element.

A preferred type of sensor 22 for incorporation into the camera 12 includes a semiconductor substrate with an overlying readout structure of the CCD type. In such a structure, packets of charge generated locally within the substrate in response to a detected radiation pattern are sequentially advanced by means of a properly-sequenced array of CCD-level voltages applied to the plurality of gates comprising the CCD readout structure. The present invention, though by no means so limited, is particularly adapted to function with, and is illustrated herein in relation to, a sensor of the type typified by the TCD 106 C that is commercially available from the Toshiba Corporation of Japan. This sensor includes a substrate of one line of 5,000 photocells (and associated wells for charge accumulation), each cell spaced seven (7) microns center-to-center. Charge packets accumulated by each photocell are transferred (in parallel) laterally out of the region of photosensitivity in two transport registers and then read out of the detector serially by means of the imposed CCD clock voltages so that two analog signals, together indicating the intensity of the radiation at 5,000 locations of the sensor 22, are provided per exposure period. The photodiodes of the sensor 22 are swept mechanically, in a direction perpendicular to the photodiode line, over the document or other image so that, in the course of multiple exposure periods, the entire two-dimensional image is sensed. Mechanical scanning occurs at a significantly slower rate than does the above-described "electronic" image scanning.

The two analog outputs of the sensor are applied to two analog-to-digital converters 24 wherein such signals are digitized into two 6-bit outputs. Significant advantages of this invention are realized, in part, by the relatively immediate conversion of the outputs of the sensor 22 to digital formats and such advantages will become readily apparent below.

The digitized outputs of the two converters 24 are transformed into a single 6-bit digitally-coded signal by means of a multiplexer 25. The multiplexer is arranged so that the frequency or bit rate of the output signal is twice that of each multiplexer input.

A hybrid filter 26 accepts the output of the multiplexer 25. The filter 26, discussed in greater detail below, utilizes a weighting process to convert the 6-bit input signal that includes "gray" level information to a single bit coded to convey "black" or "white" video information only. The accuracy, utility and validity of this representation will become particularly apparent from the discussion of the apparatus disclosed in conjunction with FIG. 5 below.

Figure 2:
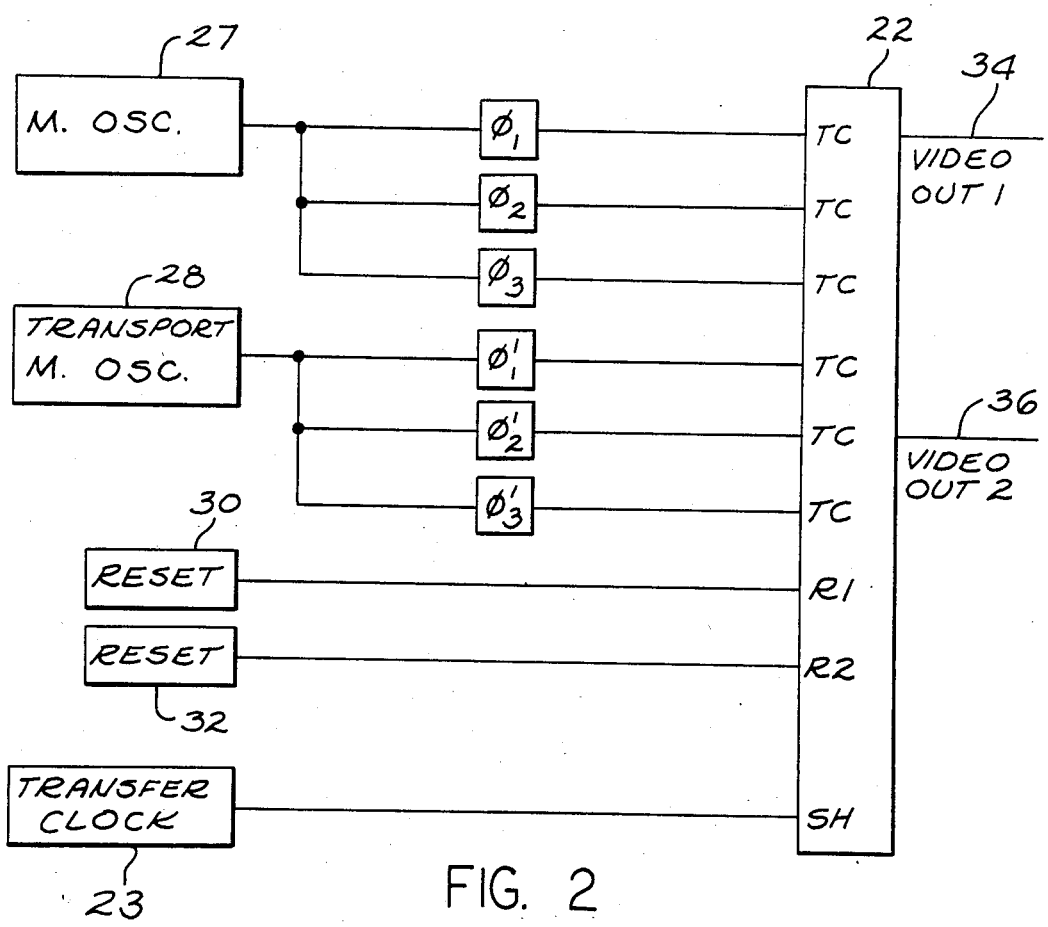
FIG. 2 is a schematic diagram of circuitry for generating analog outputs from the CCD sensor of the microfilm camera.

The image-generating circuitry of the camera 12 is shown in the schematic of FIG. 2. As illustrated, a CCD sensor 22 including a line of 5,000 photocells and two transport registers (one for the "odd" pixels and the other for the even pixels of the electronic scan) is driven by a number of clocks for transporting the charge packets that provide the analog signals of image information. Transfer clock 23 also establishes the sensor exposure period. Charge packets accumulate within the substrate of the sensor 22 when the output of the clock is low. When the output of the transfer clock 23 goes high, the electron packets accumulated in the line of photodiodes are transferred simultaneously to two laterally disposed analog transport registers of the sensor 22. Thus, one register stores and moves the odd pixel information and the other register is dedicated to the even pixels of the line image.

Transport master oscillators 27 and 28 provide clocking pulses for generating two phases of CCD charge transfer waveforms. The derived CCD clocks cause the charge packets that have been loaded into the above-referenced analog shift registers of the sensor chip 22 to propagate serially toward the sensor output port. Reset clocks 30 and 32 provide the pulses for disposing of the obsolete electron signal packets from the odd and even output ports of the sensor 22 before allowing updated values of the two analog video outputs, including 5,000 analog levels each per exposure period, representing the even and the odd pixels of the image, to be output along the conductors 34 and 36. The signal generation process referred to above is described in greater detail with reference to FIGS. 6(a) through 6(g) below.

Figure 3:
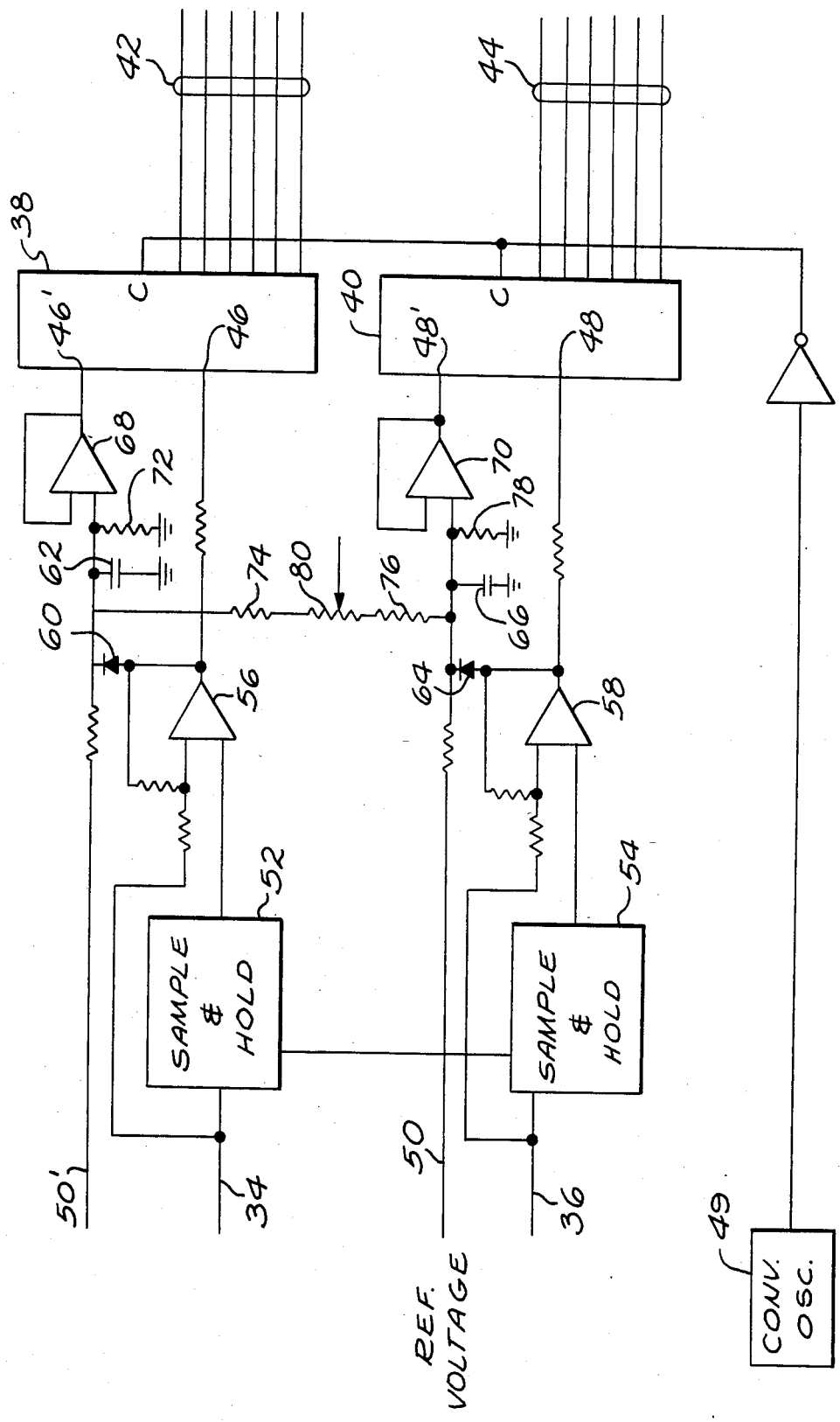
FIG. 3 is a schematic diagram of circuitry for digitizing the analog outputs of the CCD sensor.

FIG. 3 is a schematic diagram of the circuitry of the invention for digitizing the analog video outputs. As mentioned earlier, the prompt digitizing of the video information (that is, prior to the dynamic thresholding and edge enhancement of the prior art) is a significant feature of the present invention that permits the realization of numerous advantages that will become apparent below.

In addition to digitizing the analog signals transmitted along the conductors 34 and 36, the arrangement of FIG. 3 performs a continual d.c. restoration process. As a result of this process, data is provided as a percentage or fraction of the total ("black" to "white") range. Thus, with the exception of the "000000" or "111111" words (6-bit data is provided), "gray" level digital data is output.

Flash converters 38 and 40 function, in effect, as analog-to-digital converters with variable gain. Such converters also include data latches whereby the conversion of data to digital form can be controlled to occur at a preselected point in time. In operation, the converters provide 6-bit digital words along buses 42 and 44 respectively that represent the ratios of the analog inputs at the input port pairs 46, 46' and 48, 48' respectively. It will be noted that the buses 42 and 44 carry "odd" and "even" pixel information (in 6-bit form) respectively. This is a result of the manner in which the charge packets are output from the sensor 22 to form analog video signals transmitted along the conductors 34 and 36. More particularly, such an ordering of information results from the fact that the charge packets accumulated in a photodiode line are alternatively input into transfer registers built into opposed sides of the sensor 22.

Each flash converter is clocked by a converter oscillator 49. The pulses of the oscillator cause the data at the input ports of the flash converters 38 and 40 to be latched and output in digital form, at alternating ("up" and "down") pulse transitions.

A preselected reference voltage is applied to two conductors 50 and 50'. Each voltage represents the "white" level and is continuously updated in accordance with the the peak values of the voltages measured at the outputs of differential amplifiers 56 adn 58 that are discussed in greater detail below. Black level voltages are measured each time video data is obtained from a new photodiode line scan of the image 10. As a result, it will be apparent that the output voltage ratios accurately reflect image intensity throughout the scanning process (i.e. line scan to line scan.)

The analog video signals transmitted along the conductors 34 and 36 are input to sample-and-hold circuits 52 and 54. The circuits 52 and 54 are arranged so that, during the period of time that a new line is begun and during which the sensor is known to output "black" information only, the signal levels representing the analog voltages corresponding to dark-level image intensity along the conductors 34 and 36 are accumulated and stored. The dark level voltages are subsequently fed, along with the analog video information, into differential amplifiers 56 and 58 and associated resistor networks 57 and 59 that amplify the resulting difference signals by a gain of minus 5 for compatibility with the flash converters 38 and 40 (the analog video signals transmitted along the conductors 34 and 36 are 1 volt peak-to peak)

An automatic gain control circuit may be employed to adjust the reference voltage values applied to the flash converters 38 and 40. The automatic gain control circuits comprise peak detector circuits comprising a clamping diodes 60, 64 in combination with a capacitor 62, 66. The peak detector cicuits capture the maximum values of the video signals present at the outputs of the differentail amplifiers 56 and 58. These values are then fed to the ports 46' and 48' respectively via buffer amplifiers 68 and 70.

The lower limit of the voltage ranges reflected in the reference inputs 46' and 48' of the flash converters 38 and 40 is set by the voltage dividers comprising resistors 72, 74, 76 and 78 in combination with a potentiometer 80.

In the event that automatic gain control operation is not desired, the apparatus of FIG. 3 is easily reconfigured to a fixed reference operation mode. Such a mode is achieved initially by the removal of diodes 60 and 64 and the appropriate sizing of the resistors 74 and 76. Thereafter, the potentiometer 80 is adjusted to cause the required adjustments in the converter reference voltage for compensating inequalities between the levels of the analog video inputs on the conductors 34 and 36.

As a third alternative, the refence voltages may be applied to the flash converters 39 and 40 from an external circuit such as the image enhancement computer 16 for programmed reference voltage control. Thus, by either an automatic gain control, fixed reference or programmed mode of operation, the invention is able to compensate for inevitable variations in the source of light and other parameters that affect the amount of light that impinges on the CCD.

Figure 4:
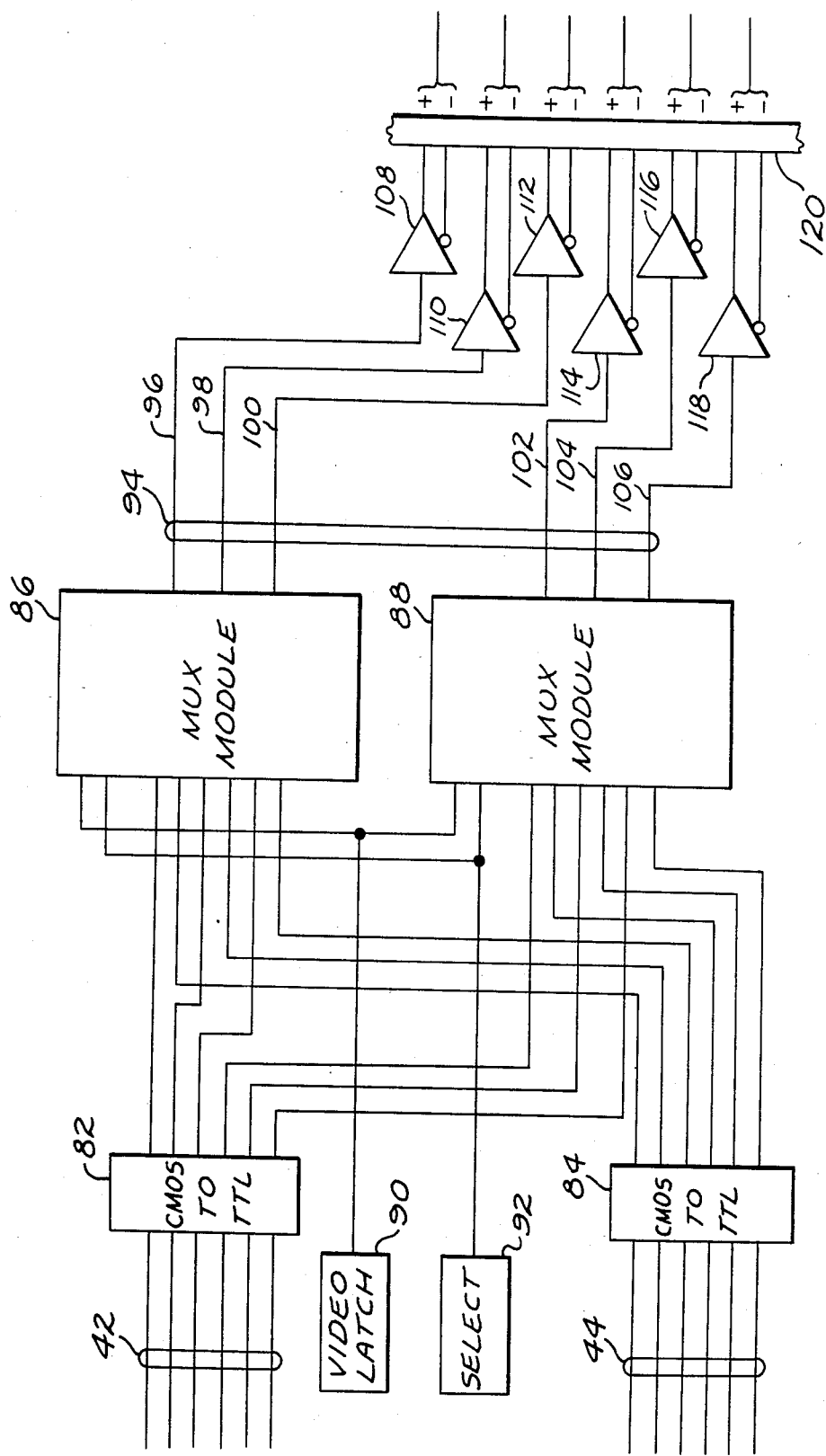
FIG. 4 is a schematic diagram of circuitry for multiplexing the digitized outputs as provided in FIG. 3 into a single channel having twice the frequency of the individual input signals.

FIG. 4 is a schematic diagram of the circuitry of the invention for multiplexing the digitized ratio video information on the 6-bit buses 42 and 44 into a single 6-bit video channel. By multiplexing the 6-bit data streams of odd and even pixel information into a single stream, the video data is partially reordered into a plurality of data streams wherein the "readings" of physically adjacent photodiodes are sequenced in time.

The buses 42 and 44 are first applied to CMOS-to-TTL converters 82 and 84 for necessary signal level adjustment prior to application to multiplexer modules 86 and 88 respectively. In combination, the modules 86 and 88 form a 12 bit-to-6 bit multiplexer.

Each module receives both a latch signal from a video oscillator 90 and a select signal from a synchronous oscillator 92. In a manner of operation similar to that of the flash converters 38 and 40, each module is operable, under the timing control of the pulses of the video oscillator 90, so that six bits of input video data, describing either an even or an odd pixel, can be latched, then output, at a preselected time. The select signal, whose frequency is one half that of the video latch signal sequentially actuates the modules 86 and 88 so that pairs of module inputs are successively multiplexed into single data streams. The sum of the output streams comprises the multiplexed data transmitted through the data bus 94.

Since the photodiodes of the sensor 22 are read out in two separate (even and odd pixel) data streams under control of the out-of-phase transfer clocks 27 and 28 and the frequency of the video oscillator 90 is such that latched data is read out at each pulse transition (up and down), the frequency of each individual stream of multiplexed data transmitted along the conductors 96, 98, 100, 102, 104 and 106 will be twice the frequency of the data streams tansmitted along the buses 42 and 44.

As is shown in FIG. 4, the parallel components of the buses 42 and 44 are "interlaced" as inputs to the multiplexer modules 86 and 88. Such interlacing is accomplished so that the ordering of odd and even photodiode data is identical (least significant bit to most significant bit or vice versa) throughout the multiplexer modules 86 and 88. Thus, the data format is rearranged by the multiplexer so that each of the individual conductors of the multilexed data bus 94 transmits a stream of data, at twice the frequency of either of the odd or even photodiode data streams. The data as multiplexed is arranged so that bits corresponding to physically adjacent diodes are adjacent in time as transmitted along the conductors 96 through 106. Further, data transmission along the bus 94 is synchronous insofar as all six bits describing the intensity of the image as detected at a particular photodiode are transmitted at the same time along each of the individual six conductors of the bus 94.

As is shown in FIG. 4, line drivers 108, 110, 112, 114, 116 and 118 provide, in combination, a standard RS-422 differential driver interface. The conductor outputs of the interface are indicated in communication with a standard PC board interconnect terminal 120. In the event that the user desires to bypass the signal processing of the hybrid filter of the invention (discussed in detail in conjunction with the following figure) the outputs provided at the interface 120 may be applied to a conventional image enhancement computer for additional state of the art processing and storage.

Figure 5:
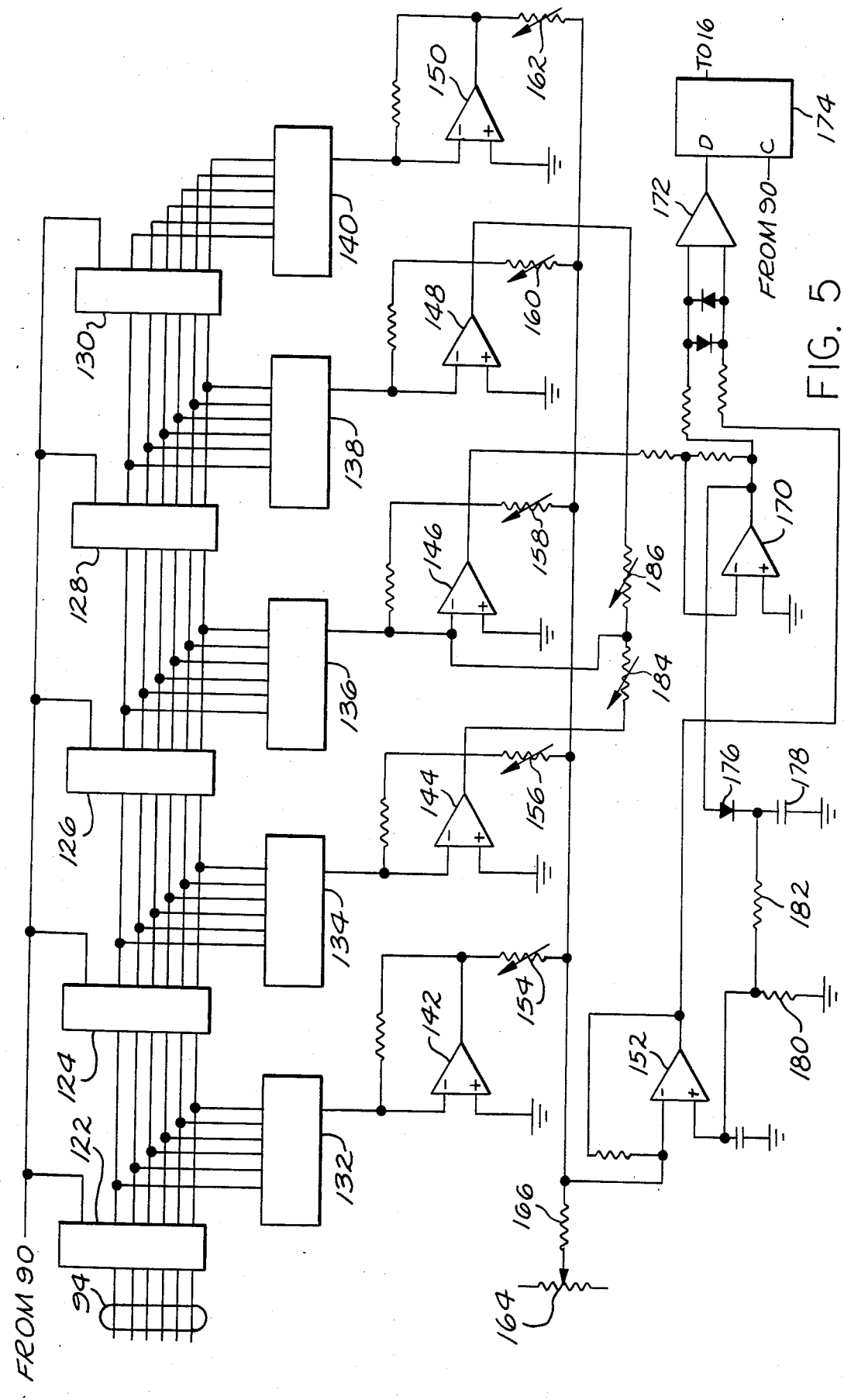
FIG. 5 is a schematic diagram of the hybrid filter of the CCD camera of the invention.

FIG. 5 is an electrical schematic diagram the hybrid digital filter 26 of the invention. The filter performs many of the functions presently performed in an image enhancement computer. When employing a computer, the designer is faced with certain inherent limitations of the digital computation process. Most significantly, numerical processing is limited to a single operation, whether it be multiplication of addition, at a time. While the hybrid digital filter of the invention operates upon a digital data format (i.e. the six bit words describing intensity level along the output bus 94), the filter is in fact a dedicated analog computer. As will be seen from the description that follows, this permits the simultaneous performance of diverse mathematical functions (such as multiplication and addition) at a single point in time, vastly enhancing the effective computational power and speed of image enhancement.

The hybrid filter includes six bit hex latches 122, 124, 126, 128 and 130 that are arranged to accept the multiplexed output bus 94. The gray level video data of the bus 94 is latched into the first hex latch 122 upon the application of an upgoing pulse edge from the video oscillator 90. After a pulse-duration settling period, this video data is then output to both the next latch 124 and voltage ladder network connected to it. This process is repeated with each positive transition of the video clock pulse whereby the data of the bus 94 (comprising 5,000 six bit digital words per line scan, representing the 5,000 locations or photocells per line where image intensity is measured) is successively shifted rightward from latch to latch.

Each time the data of the bus 94 is output from one of the hex latches, it is both shifted to the next latch and entered into a voltage ladder network. The networks 132, 134, 136, 138 and 140 comprise identical arrangements of resistors scaled so that, at their outputs, currents are produced that are functions of the binary values values applied thereto in the form of the six voltage states of the output from the associated hex latch. The arrangement and design of such networks are exceedingly well-known in the art.

The conversion of the binary states of the bus 94 to a usable analog form is completed by means of associated operational amplifiers 142, 144, 146, 148 and 150. The amplifiers act as current-to-voltage converters whose output voltages are proportional to the current outputs of the associated voltage ladder networks. Thus, a digital-to-analog converter is associated with each of the hex latches 122, 124, 126, 128 and 130.

In the digital filter, a single analog voltage is derived, having one of two possible values, for each of the photocells or pixels of each line scan. The array of voltage values represents a storable and reproducible electronic image of the document 10. The two possible voltage values correspond to "black" and "white" shadings. The algorithm employed for deriving the storable electronic values operates upon the basic premise that the correct value is "white" when the pixel under investigation is lighter than a weighted average of the proximate pixels (including itself) and "black" when the pixel is darker.

As is apparent from the arrangement of FIG. 5, the data of the bus 94 enters the filter at hex latch 122 and is successively shifted rightward into the remaining latches. Since the time sequence of six bit words of the multiplexed bus 94 corresponds to the linear photodiode sequence of the sensor 22, one can see that, over time, the levels of illumination of five adjacent photodiodes are continually entered into the hex latches 122 through 130.

The filter is arranged to generate an output pixel level for the photodiode entered into the middle hex latch 126. At that time, the latches 122 and 124 store gray level values of photodiodes to one side of the photodiode under investigation and the latches 128 and 130 store values of photodiodes to the other side of the photodiode. The physical location of such other photodiodes with respect to the photodiode under investigation will depend upon the direction in which the analog data of conductors 32 and 34 is read out of the sensor 22.

The five weighted analog values of photocell intensity are summed by an operational amplifier 152. The relative weights assigned to the photocell locations proximate to the pixel under investigation are set by the relative values of the resistances 154, 156, 158, 160 and 162. Potentiometer 164 and resistor x provides a network for adjusting the d.c. level of the output of the operational amplifier 152.

The outputs of the operational amplifiers 142 through 150 are inversions of the actual analog intensity equivalent voltages. A required inversion of the summed voltages takes place by virtue of the processing of the operational amplifier 152. The inversion of the output of the photocell under investigation takes place at an operational amplifier 170.

The outputs of the amplifiers 170 and 152, representing the intensity measured at the pixel or photocell under investigation and a weighted average of the intensities measured at the surrounding photocells respectively, are input to a comparator 172. The output of the comparator 172 goes "high" when the measured intensity of the photocell under investigation exceeds the weighted average and "low" when such intensity is less than the weighted average. Thus, the algorithm whereby a white level or a black level is chosen in accordance with the surrounding gray level intensities, is implemented by the hybrid digital filter of the invention.

The output of the comparator 172 is applied to a D-type flip flop 174. The flip flop 174 is clocked by pulses from the video oscillator 90. Thus the data is synchronously read out from the sensor 22 and output from the filter 26.

The filter 26 additionally includes a feedback mechanism for compensating fluctuations in background illumination intensity. Such fluctuations can affect the photocell weighted average value significantly. As mentioned above, an automatic gain control option is available for correcting for this error source at the stage of analog-to-digital conversion. This is disclosed and discussed in reference to FIG. 3 above. In the event that this feature is already employed in the system of the invention, the feedback control mechanism described below is not required.

Returning to FIG. 5, a diode 176 and a capacitor 178, in combination, form a peak detector circuit that captures the maximum output from the operational amplifier 170. Resistors 180 and 182 attenuate this maximum value by an amount determined in accordance with the contribution of the measured photocell to the proximate photocell average value. The value is then input to the non-inverting input port of the operational amplifier 152. By utilizing the maximum measured value of the photocell output as an input to the operational amplifier 152, the d.c. bias of the output of the operational amplifier 152 is shifted in such a way as to remain "centered" with respect to the analog video output of the operational amplifier 170 regardless of changes in the amplitude of the output of the operational amplifier 170.

The arrangement of the filter of FIG. 5 additionally provides edge enhancement capability. Resistors 184 and 186 form a portion of such circuitry. This circuitry functions by subtracting a portion of the value of the pixels "prior" and "subsequent" to the pixel under investigation. Such processing causes the transitions before and after (low-to-high and high-to-low) to be "sharper" (i.e. to take less time). Such edge enhancement results in a higher resolution picture and greater detail.

The edge enhancement procedure described above is unencumbered by any attendant phase distortion. Such phase distortion evidences a displacement in time of the processed (sharpened) pixel waveform. This edge enhancement procedure differs from conventional edge enhancement processes that employ a differentiating circuit. Such conventional processes have encountered apparent lateral displacement of the sharpened lines on a picture.

The operation of the present invention is further apparent from FIGS. 6(a) through 6(k), a set of timing diagrams that illustrate a number of the functions of the invention. A number of the timing sequences have been described above briefly with reference to related apparatus.

Figure 6:
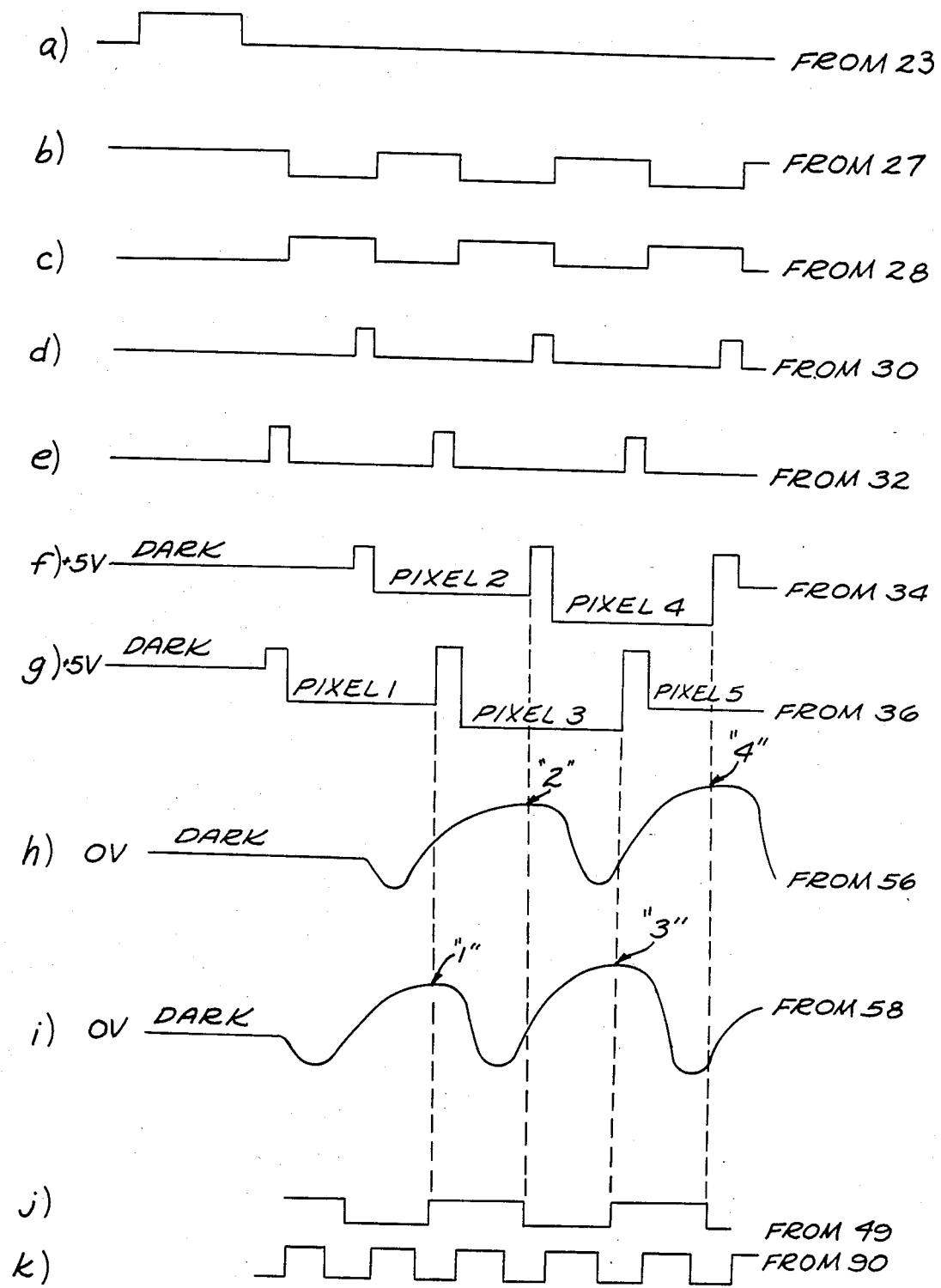
FIGS. 6(a) through 6(k) comprise a series of timing diagrams for illustrating the mode of operation of the invention.

FIGS. 6(a) through 6(e) present the waveforms which interact to read out the charge accumulations of the 5,000 photocells per line of the sensor 22 whereby two analog video signals (including gray level intensities) are output on the conductors 34 and 36. The waveform of FIG. 6(a) represents the output of the transfer clock 23. This waveform establishes the exposure period of the sensor photocells. When this signal is low, electron packets accumulate in the photodiodes. Upon a change of state to the high level, the accumulated charge packets are transferred laterally to transport registers (analog CCD shift registers) located at opposed sides of the sensor 22. As mentioned previously, the charge packets are input alternatively into the opposed registers. Thus, odd-numbered photocell charge packets accumulate in one register, even-numbered photocell charge packets accumulate in the other.

FIG. 6(b) and 6(c) are waveforms of the outputs of the transport master oscillators 27 and 28. As can be seen, the two signals are of opposite phase. These signals provide the master clocking for two sets of CCD voltages that cause the charge packets transferred out of the line of photocells of the sensor 22 and into the opposed transport registers to propagate serially through the registers toward their respective output ports.

FIGS. 6(d) and 6(e) represent the outputs of the reset clocks 30 and 32 respectively. Again, the two waveforms are out of phase, reflecting the phase difference between the CCD voltages that drive the accumulated charge packets through the two transport registers of the sensor 22. The charge packets accumulated in the transfer register that are clocked therethrough under the control of the transport master oscillator 27 are output as voltage levels on the conductor 34 immediately after a pulse from the reset clock 30 is applied thereto. The like process occurs with respect to the other transfer register as a result of the interaction of the outputs of the transport master oscillator 28 and the reset clock 32 to generate an analog signal on the conductor 36. Thus, the analog waveforms are output along the conductors 34 and 36 at the frequency of the pulse waveform outputs of the reset clocks 30 and 32 (As can be seen, pulses from the reset clocks occur once per each period of a transport master oscillator output waveform.)

The waveforms output along the conductors 34 and 36 are shown in FIGS. 6(f) and 6(g) respectively. Upon the application of a pulse from a reset clock, and after an initial very high frequency rise in the voltage on the conductor of about 50 nanoseconds duration (inherent in the capacitance of the sensor 22 and the process of charge transfer through the analog shift registers), the amount of charge (electrons) accumulated in a photocell is read out as a decrease in potential. (The nominal potential of each of the conductors is 5 volts and maximum charge accumulation would be reflected in a measured reduction of one volt d.c.) One of the conductors is in communication with the output port of the sensor that accepts the charge packets from the odd photocell transfer register and the other conductor is in communication with the output port of the sensor that accepts the charge packets from the even photocell transfer register. Arbitrarily, the waveform of FIG. 6(f) is assumed to represent the even photocell values and the waveform of FIG. 6(g) is assumed to represent the odd photocell output values.

FIGS. 6(h) through 6(k) relate to the digitizing of the analog signals and to the apparatus illustrated in and discussed previously in connection with FIG. 3. This process is complicated by various unavoidable transients. By recognizing this problem and by arranging the apparatus in accordance therewith, such inherent difficulties are minimized.

The waveforms of FIGS. 6(h) and 6(i) depict the outputs of the amplifiers 56 and 58 shown in FIG. 3. As mentioned previously, these amplifiers convert the analog video values generated within the sensor 22 (range of 5 to 4 volts) to appropriate values (range of 0 to 5 voltage) for input to the flash converters 38 and 40 respectively. As is seen from the waveforms, the amplification process additionally results in an inversion of the input analog video signals.

Comparing the input with the output waveforms of the amplifiers 56 and 58, it is noted that a depression from 0 volts d.c. (of approximately 50 nanosecond duration) in each amplifier output waveform follows the upgoing 50 nanosecond long "return-to-zero" transient existing between pixel locations of the input waveforms. A transport delay, a feature of the comparatively "mushy" amplifier response, accounts for the time lag between the upgoing transient in the input and the downgoing depression transient in the output of the amplifier.

Obviously, the amplifier responses pose serious problems insofar as the analog-to-digital conversion process is concerned. To overcome this problem, the present invention accounts for the "return-to-zero" transients by delaying the conversion process within the flash converters 38 and 40 for a predetermined amount of time. This time is sufficient for the amplifier responses to settle (i.e. for the amplifier outputs to approach steady state values). The invention implements this feature in two ways. In a first aspect, the flash converters 38 and 40, as discussed above, are integrated circuits capable of latching data at their input ports at predetermined points in time. Secondly, the pulse train output of the converter oscillator 49 is such that, as shown by FIGS. 6(h) and 6(i), in conjunction with FIG. 6(j), the output waveform of the oscillator 49 latches relatively steady state analog video values into the flash converters 38 and 40 for subsequent conversion to digital. Further, the output pulses from the converter oscillator 49 are timed, with reference to the pulses from the CCD transport clocks 27 and 28, so that the outputs of the amplifiers are taken at identical points in time with regard to each pixel. By utilizing such a sampling technique, one is assured that each pixel value is measured at the same point of its rise time. Hence, accurate ratios are maintained between the sampled pixel values output from the amplifiers.

As can be seen from the figures, the analog values of even pixels are latched at the flash coverters by the downgoing edges of the pulse train of the converter oscillator 49 while the analog values of odd pixels are latched at the flash converters by the upgoing edges of such pulses. The latching edges of the pulse train coincide with the upgoing edges of the pulses from the reset clocks 30 and 32. As the upgoing edges from the reset clocks cause the dumping of the electron packets prior to the outputting of new electron packets onto the conductors 34 and 36, it is seen that the oscillator 49 causes data to be latched at the flash converters at the last possible moment (i.e. just before a new pixel value is applied to an amplifier). By the utilization of such timing, the best steady state analog value is latched for subsequent conversion.

As mentioned above, the dark level voltage is sampled at the beginning of each photocell line scan. This dark level voltage is indicated by the 8 volt level and the 0 volt level at the leftmost portions of FIG. 6(f) through 6(i).

The output of the video oscillator 90 is shown in FIG. 6(k). This pulse train is applied to the multiplexer modules 86 and 88. As mentioned in preceding text, the upgoing edges of pulses from the oscillator 90 latch data at the output ports of the modules 86 and 88. The frequency of the output of the video oscillator 90 is double that of the converter oscillator 49. This is a reflection of the fact that, in accordance with the switching pulses from the oscillator 92, both an odd and an even pixel digital word is shifted to the output port of each multiplexer module for each video sampling period as a consequence of the multiplexing together of two ninety degreee out-of-phase timing sequences.

Thus, it is seen that an improved method and apparatus have been brought to the signal processing art. Such method and apparatus are especially adapted to the peculiar needs of electrical image detection from poor quality originals. More particularly, the teachings herein address a number of problems commonly experienced in the acquisition of an image as sensed by a wavelength sensitive detector, such as a radiation detector of the CCD type, to accurate and usable electronic form.

By utilizing the invention, one may readily attain data appropriate for storage in a digital memory 18 or for further conventional processing by a standard image enhancement computer 16. The teachings of the invention enable one to realize advantages not attainable with state of the art systems. In large part, numerous advantages are attained by the selection and arrangement of the system. In the invention, data is converted to digital form more readily than in prior art system. As a result, the accuracy of the following signal processing is enhanced. The system reverts to analog processing subsequent thereto whereby the speed and computational power of a unique hybrid filter is attained. The invention, by incorporating an analog computer contrary to the prior art's usage of a digital image enhancement computer, thereby attains additional advantages over the prior art.

While the invention has been described with reference to its presently preferred embodiment, its scope is not limited thereto. Rather, the scope of this invention is as defined in the following set of claims and all equivalents and is not otherwise limited.

What is claimed is:

1. An electronic camera for processing at least one electrical signal comprising the intensity values of a plurality of pixels of an image detected by a CCD comprising, in combination:
   (a) means in communication with said CCD for converting said at least one signal into a digital signal that includes gray level information;

(b) said means including (i) means for storing the black level of said at least one analog signal during successive charge accumulation periods, (ii) means including at least one amplifier for taking the difference between said black level and the analog pixel signal levels generated during each charge accumulation period, (iii) means including at least one flash converter for generating the digital signal equivalent of each of said differences, and means for applying a reference signal to said means for generating the digital signal equivalent so that said digital signal corrsponds to a fraction of a predetermined voltage range;

(c) means for filtering said digital signal in accordance with adjacent pixel information to generate a dynamic threshold with respect to a preselected scanned pixel;

(d) means for assigning a black or white level signal value to said preselected pixel in accordance with said dynamic threshold; and (e) means for providing said assigned signal value to an output device.

2. An electronic camera as defined in claim 1 further characterized in that:

(a) said CCD generates two analog electrical signals, for application to and conversion to two corresponding digital signals by said means for converting, said signals comprising the intensity values of alternately spaced photocells of said CCD; and (b) said camera additionally includes means for multiplexing said two digital signals into a stream of digital data wherein adjacent pixels are described by sequential digital words.

3. An electronic camera for processing at least one electrical signal comprising the intensity values of a plurality of pixels of an image detected by a CCD comprising, in combination:

(a) means in communication with said CCD for converting said at least one signal into a digital signal that includes gray level information;

(b) means for filtering said digital signal in accordance with adjacent pixel information to generate a dynamic threshold with respect to a preselected scanned pixel;

(c) said last-named means including (i) means for weighting the analog values of preselected adjacent pixels by predetermined values, and (ii) means for combining said weighted analog values with the analog value of said predetermined scanned pixel to derive a dynamic threshold value;

(d) said means for combining including (i) a first operational amplifier for accepting the analog value of said preselected scanned pixel, (ii) a second operational amplifier for accepting the sum of the weighted analog values of said adjacent pixels, (iii) means for detecting the peak analog value of said preselected pixel, (iv) means for adjusting the d.c. bias of said second operational amplifier in accordance with said peak value;

(e) means, comprising a comparator arranged to accept the ouput of said means for combining said weighted analog values with the analog value of said predetermined scanned pixel, for assigning a black or white level signal value to said preselected pixel in accordance with said dynamic threshold; and (f) means for providing said assigned signal value to an output device.

* * * * *